United States Patent [19]
Weng

[11] Patent Number: 5,736,830
[45] Date of Patent: Apr. 7, 1998

[54] MOBILE TELEPHONE CHARGER

[76] Inventor: Ying-Chao Weng, P.O. Box 90, ¢Tainan 704, Taiwan

[21] Appl. No.: 791,357

[22] Filed: Jan. 30, 1997

[51] Int. Cl.[6] .................................................. H02M 10/44
[52] U.S. Cl. ............................................................. 320/2
[58] Field of Search ........................... 320/2; D13/107, D13/110

[56] References Cited

U.S. PATENT DOCUMENTS

| | | | |
|---|---|---|---|
| 4,109,193 | 8/1978 | Schultheis | 320/2 |
| 4,829,224 | 5/1989 | Gandelman et al. | 320/2 |
| 4,903,325 | 2/1990 | Yoshitake et al. | 455/89 |
| 5,162,719 | 11/1992 | Tomura et al. | 320/2 |
| 5,189,358 | 2/1993 | Tomura et al. | 320/2 |
| 5,510,691 | 4/1996 | Palatov | 320/2 |
| 5,642,402 | 6/1997 | Vilmi et al. | 379/58 |

*Primary Examiner*—Peter S. Wong
*Assistant Examiner*—Gregory J. Toatley, Jr.

[57] ABSTRACT

A charger usable in houses and in cars includes a transformer and a transfer base. The transformer has a terminal plug for connecting with a charge base of a mobile telephone, and two blades for connecting with an outlet of electricity in a house. The transfer base has an opening formed in a front portion for the transformer to fit therein, with two conductors on the transfer base and on the transformer to contact with each other. Further, the transferring base has a charge plug for inserting in an outlet of electricity in a car for charging.

2 Claims, 4 Drawing Sheets

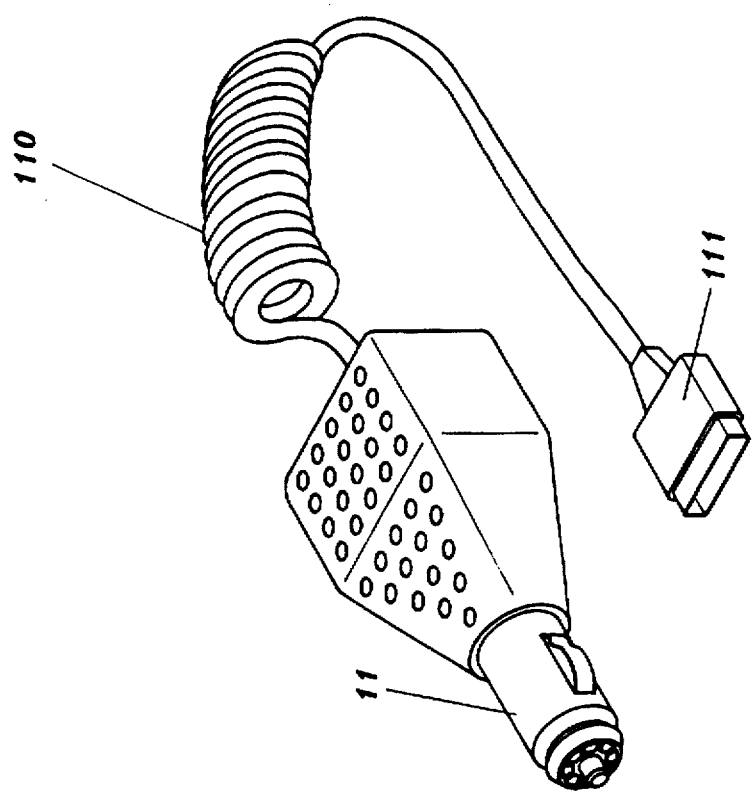
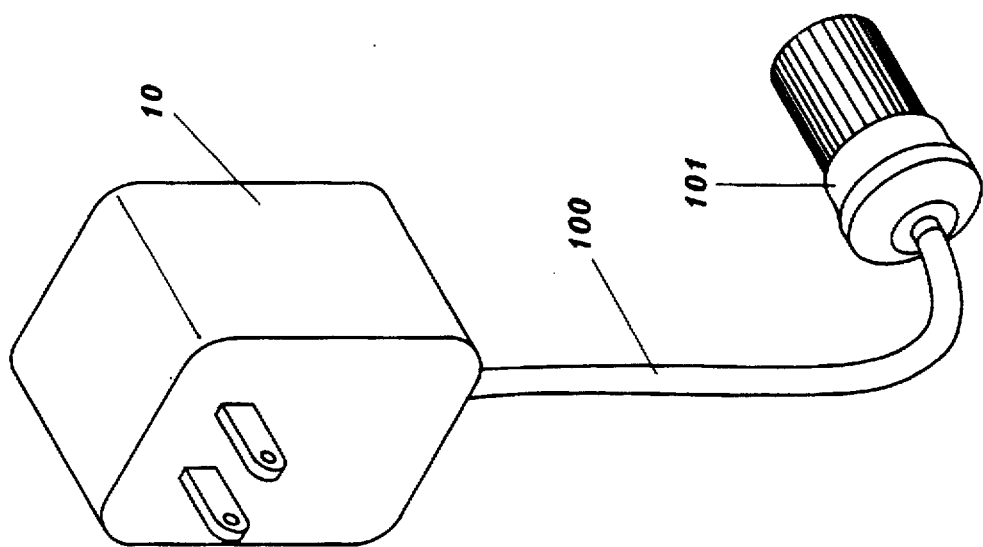
FIG.1 (PRIOR ART)

MOBILE TELEPHONE CHARGER

BACKGROUND OF THE INVENTION

This invention relates to a mobile telephone charger usable in houses and in cars, and particularly to a charger including a charge transformer and a transfer base combined together that is easy to handle and low in cost.

A known conventional charger usable in houses and in cars is shown in FIG. 1 and includes a transformer 10 and a charge plug 11 for use in a car. The transformer 10 has a lead wire 100 and a socket 101 connected with an end of the lead wire 100. The charge plug 11 has a lead wire 110 and a terminal plug 111.

In case a mobile telephone is to be charged in a house with this conventional charger, the terminal plug 111 is connected with a charge base of the mobile telephone, and the socket 101 of the transformer 10 is connected with the charge plug 11. Then the transformer is plugged in an electric outlet in a house for charging.

If the mobile telephone is to be charged in a car, the charge plug 11 is separated from the socket 101 of the transformer 10 and inserted in an electric outlet in the car for charging. However, the transformer 10 has a lead wire 100 connected with a socket 101, and the charge plug 11 has a lead wire 110, so this conventional charger has a rather complicated structure that is not so simple to handle in charging and has a comparatively high cost.

SUMMARY OF THE INVENTION

The main purpose of the invention is to offer a charger usable in houses and in cars and having a simpler structure than the known charger described above.

A main feature of the invention is a charge transformer having a terminal plug that is able to connect with a charge base of a mobile telephone for charging from alternating current (AC) in a house, and a transfer base that is able to connect with the transformer for charging from direct current (DC) in a car, with the transfer base having a plug that can be inserted in an electric outlet of the car.

BRIEF DESCRIPTION OF DRAWINGS

This invention will be better understood by referring to the accompanying drawings, wherein:

FIG. 1 is an exploded perspective view of a known conventional charger;

DETAILED DESCRIPTION OF THE PREFERRED EMBODIMENT

Figure 2:
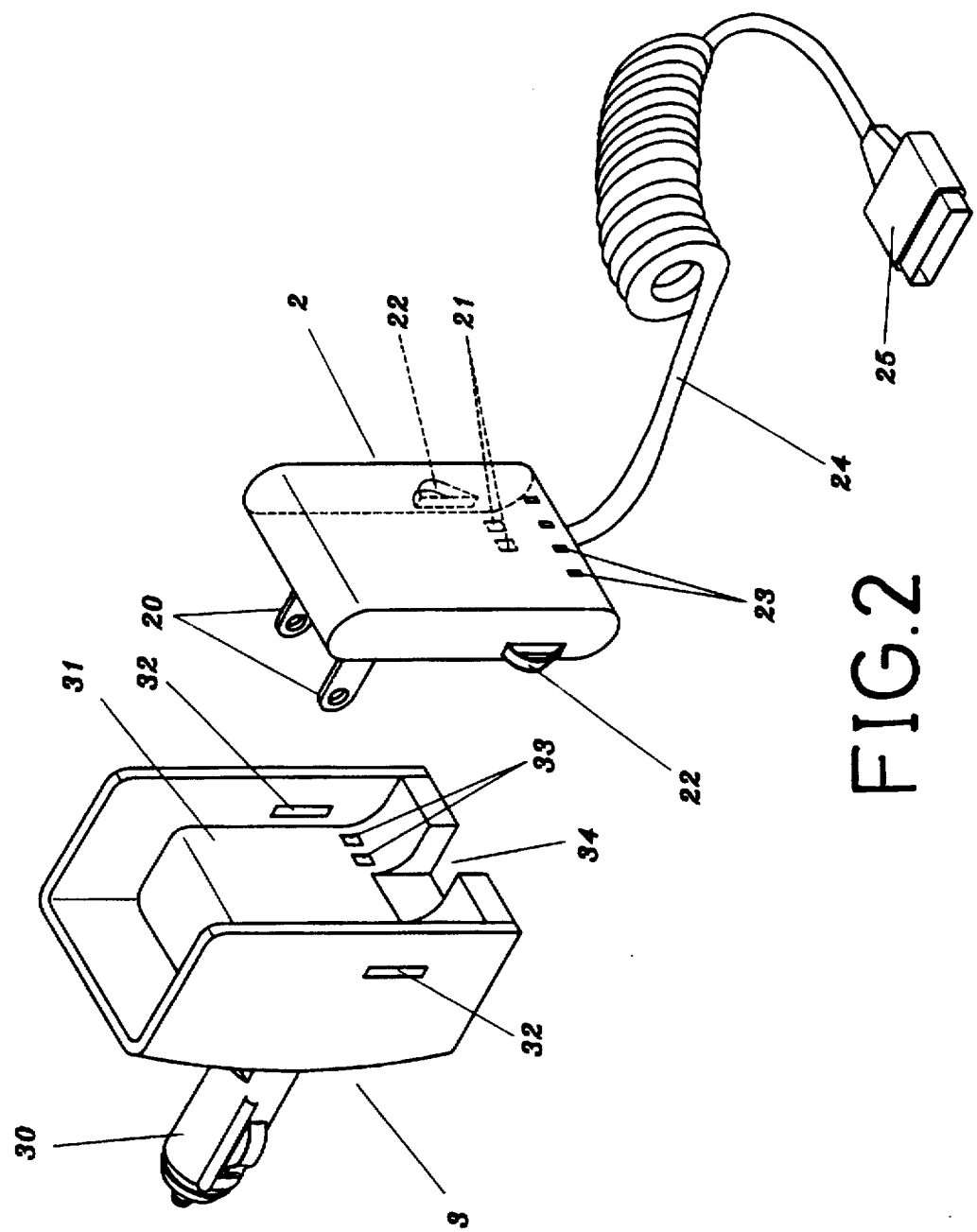
FIG. 2 is an exploded perspective view of a charger usable in houses and in cars according to the present invention.

A preferred embodiment of a charger usable in houses and in cars, as shown in FIG. 2, includes a charge transformer 2 and a transfer base 3 combined together.

The transformer 2 has two blades 20, 20 spaced apart and extending from a rear surface, two flat conductors 21, 21 spaced apart on a lower portion of a front surface, a pair of elastic members 22 extending from two opposed side walls sides, several lamps 23 spaced apart on the front surface for showing the volume of electricity charged, a lead wire 24 and a terminal plug 25 connected to an outer end of the lead wire 24.

The transfer base 3 includes a plug 30 extending out of a rear side, an opening 31 formed in a front portion, an engagement slot 32 in each of a lower portion of two side walls for engagement by the two elastic press pieces 22, 22 to fit, and two flat conductors 33, 33 on a lower portion of a front wall defining the opening 31 in corresponding locations to the conductors 21, 21 of the transformer 2. Further, a large notch 34 is formed in a front bottom side of the base 3.

When a mobile telephone is to be charged in a house, the terminal plug 25 of the transformer 2 is inserted in a charge base of the mobile telephone, and the blades 20, 20 of the transformer 2 are inserted in an electric outlet in the house. The mobile telephone can then be charged in the house, with the lamps 23 showing how much electricity is charged therein. The transfer base 3 is not necessary for charging in a house, only for charging in a car.

Figure 3:
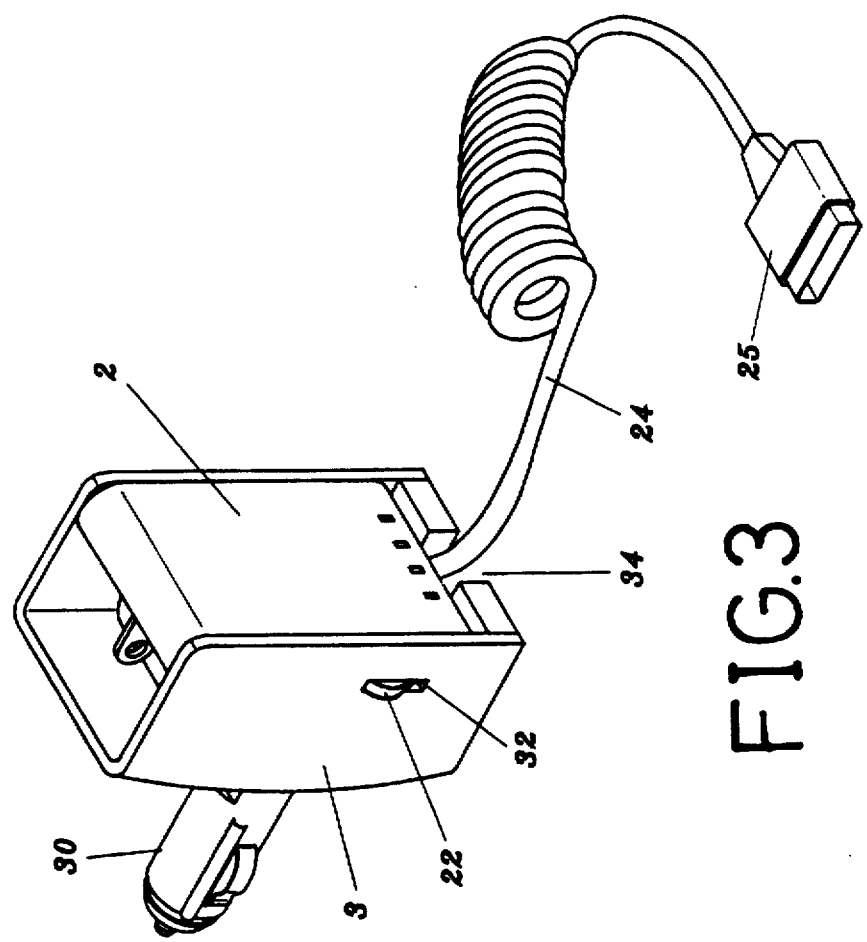
FIG. 3 is a perspective view of the charger usable in houses and in cars in the present invention; and, FIG. 4 is a front view of the charger usable in houses and in cars in the present invention.
Figure 4:
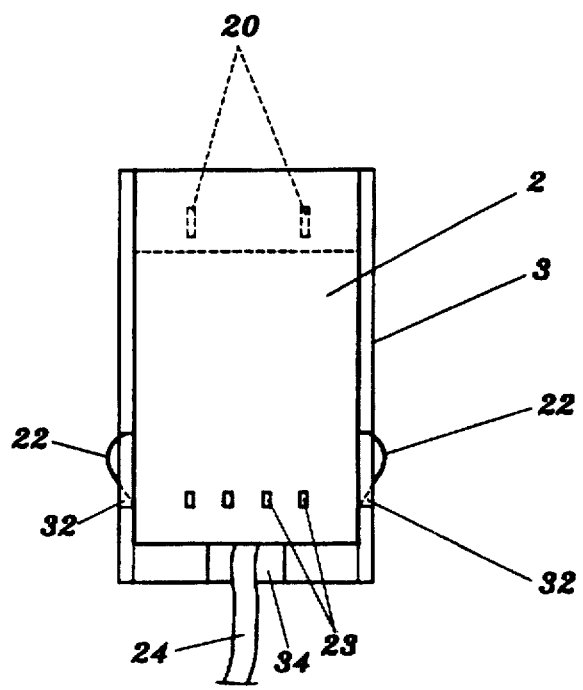

Referring to FIGS. 3 and 4, when a mobile telephone is to be charged in a car, the transformer 2 is inserted in the front opening 31 of the transfer base 3, with the two elastic press pieces 22, 22 engaging and protruding out of the two slots 32, 32, and with the initial portion of the lead wire 24 fitting in the large notch 34. At the same time, the two flat conductors 21, 21 of the transformer 2 are in contact with the two flat conductors 33, 33 of base 3. Then the transformer 2 is held securely in the transfer base 3. The plug 30 of the transfer base 3 can be inserted in an electrical outlet of a car, with the terminal plug 25 inserted in a charge base of a mobile telephone for charging. Thus, the transfer base 3 does not need an extra wire for connection with the transformer 2, simple to handle in charging a mobile telephone.

When the transformer 2 is required to be removed from the transfer base 3, the two elastic press pieces 22 are pressed inwardly to disengage same from the slots 32.

As can be understood from the above description, a charger usable in houses and in cars in the present invention has advantages as follows.

What is claimed is:

1. A mobile telephone charger comprising:

a) a transformer including a terminal plug for connection to a charger base of a mobile telephone, a lamp means for indicating the amount of electricity charged to the telephone, a pair of blades for engaging an alternating current electric socket of a house, and a first pair of conductors;

b) a transfer base including a second pair of conductors, an opening for receiving the transformer and disposing the first and second pairs of conductors into electrical contact with each other, and a plug for engaging a direct current electric socket of a car; and c) engagement means for detachably securing the transformer to the transfer base when the transformer is received within the opening of the transfer base.

2. The mobile telephone charger of claim 1 wherein:

a) the transformer and the transfer base each further includes a pair of sidewalls; and b) the engagement means includes a pair of elastic members extending outwardly from the sidewalls of the transformer and a pair of slots formed in the sidewalls of the transfer base for detachable engagement by the elastic members.

* * * * *